(12) United States Patent
Bonzini

(10) Patent No.: US 10,162,873 B2
(45) Date of Patent: *Dec. 25, 2018

(54) SYNCHRONIZATION OF PHYSICAL DISKS

(71) Applicant: Red Hat, Inc., Raleigh, NC (US)

(72) Inventor: Paolo Bonzini, Turate (IT)

(73) Assignee: Red Hat, Inc., Releigh, NC (US)

( * ) Notice: Subject to any disclaimer, the term of this patent is extended or adjusted under 35 U.S.C. 154(b) by 127 days.

This patent is subject to a terminal disclaimer.

(21) Appl. No.: 13/724,326

(22) Filed: Dec. 21, 2012

(65) Prior Publication Data

US 2014/0181015 A1 Jun. 26, 2014

(51) Int. Cl.
*G06F 17/30* (2006.01)

(52) U.S. Cl.
CPC .............. *G06F 17/30578* (2013.01)

(58) Field of Classification Search
CPC ...... G06F 9/45533; G06F 9/50; G06F 3/0628; H04L 49/00
See application file for complete search history.

(56) References Cited

U.S. PATENT DOCUMENTS

| 5,797,022 | A * | 8/1998 | Shimotono | G06F 1/32 711/135 |
| 6,243,715 | B1 * | 6/2001 | Bogantz et al. | 707/612 |
| 7,203,796 | B1 | 4/2007 | Muppalaneni et al. | |
| 7,346,909 | B1 * | 3/2008 | Eldar | H04L 29/12924 709/202 |
| 8,156,301 | B1 * | 4/2012 | Khandelwal et al. | 711/170 |
| 8,429,651 | B2 | 4/2013 | Donnellan et al. | |
| 8,719,286 | B1 * | 5/2014 | Xing et al. | 707/755 |
| 2003/0172316 | A1 | 9/2003 | Tremblay et al. | |
| 2006/0112212 | A1 * | 5/2006 | Hildner | G06F 9/45537 711/6 |

(Continued)

FOREIGN PATENT DOCUMENTS

EP 1674992 A1 * 6/2006 .......... G06F 11/1484

OTHER PUBLICATIONS

Live and incremental whole-system migration of virtual machines using block-bitmap, Luo et al, IEEE Conference on Cluster Computing, pp. 99-106, 2008.*

(Continued)

*Primary Examiner* — Augustine K. Obisesan
(74) *Attorney, Agent, or Firm* — Lowenstein Sandler LLP

(57) ABSTRACT

In a process for migrating a virtual machine's storage from a source disk to a destination disk, during a steady state (i.e., wherein the contents of the virtual machine stored on the source disk and the destination disk are equal), a virtual machine monitor receives a set of write requests from a guest operating system ("guest") of the virtual machine, provides confirmation of the completion of the set of writes to the source disk, and asynchronously replicates the set of write requests to the destination disk. Upon receipt of a flush request from the guest, the virtual machine monitor confirms completion of the flushing of the destination disk following replication of the write requests to the destination disk. Upon receipt of a switch request from a virtual machine manager, the virtual machine monitor switches the virtual machine to the destination disk and issues subsequent write requests to the destination disk.

20 Claims, 5 Drawing Sheets

(56) References Cited

U.S. PATENT DOCUMENTS

| | | | |
|---|---|---|---|
| 2006/0123416 A1* | 6/2006 | Cibrario Bertolotti | G06F 9/45533 718/1 |
| 2006/0143517 A1* | 6/2006 | Douceur | G06F 11/1484 714/21 |
| 2007/0234106 A1 | 10/2007 | Lecrone et al. | |
| 2008/0177964 A1 | 7/2008 | Takahashi et al. | |
| 2009/0089781 A1* | 4/2009 | Shingai et al. | 718/1 |
| 2009/0113109 A1* | 4/2009 | Nelson et al. | 711/6 |
| 2009/0216975 A1* | 8/2009 | Halperin | G06F 9/45537 711/162 |
| 2009/0240904 A1* | 9/2009 | Austruy | G06F 11/1662 711/162 |
| 2010/0011178 A1* | 1/2010 | Feathergill | 711/162 |
| 2010/0049929 A1* | 2/2010 | Nagarkar et al. | 711/162 |
| 2010/0082922 A1* | 4/2010 | George | G06F 9/461 711/162 |
| 2010/0169591 A1* | 7/2010 | Atluri et al. | 711/162 |
| 2010/0228913 A1* | 9/2010 | Czezatke et al. | 711/112 |
| 2011/0191557 A1 | 8/2011 | Bitar et al. | |
| 2011/0246714 A1* | 10/2011 | Zhou et al. | 711/162 |
| 2012/0072393 A1* | 3/2012 | Kumar | G06F 17/30174 707/634 |
| 2012/0137098 A1* | 5/2012 | Wang et al. | 711/165 |
| 2012/0151084 A1* | 6/2012 | Stathopoulos | G06F 9/48 709/232 |
| 2012/0227058 A1* | 9/2012 | Hunt | G06F 9/45558 719/318 |
| 2012/0324183 A1* | 12/2012 | Chiruvolu | G06F 11/2038 711/162 |
| 2014/0033201 A1 | 1/2014 | Dawkins et al. | |
| 2014/0040572 A1* | 2/2014 | Kotagiri et al. | 711/159 |

OTHER PUBLICATIONS

Remus: High availability via asynchronous virtual machine replication, Cully et al, Fifth USENIX Symposium on Network Systems Design and Implementation, pp. 161-174, 2008.*

Notice of Allowance for U.S. Appl. No. 13/724,692, dated Sep. 10, 2014.

* cited by examiner

SYNCHRONIZATION OF PHYSICAL DISKS

TECHNICAL FIELD

The embodiments of the disclosure relate generally to virtual machine systems and, more specifically, to migration of a virtual machine's storage between physical disks.

BACKGROUND

In a virtual computing environment, a virtual machine's storage may be migrated from one physical disk (a source disk) to another physical disk (a destination disk). A virtual machine monitor may be employed to manage resources when the virtual machine is running, including tracking the migration from the source disk to the destination disk. A typical virtualization system includes a virtual machine manager configured to manage the resources when the virtual machine is off and send a request to a virtual machine monitor to execute the switch to the destination disk (i.e., abandon the source disk and proceed with the destination disk only). However, after sending the request, the virtual machine manager may exit before receiving confirmation from the monitor that the migration was successfully completed and it is safe to restart the virtual machine using the destination disk. When the virtual machine manager is restarted, it is unaware of what occurred following its exit and whether the virtual machine is still using the source disk (e.g., when the command from the virtual machine manager was not received by the virtual machine monitor, or when a failure of the destination disk caused a failure of migration and a lack of symmetry between the data on the source disk and the data on the destination disk).

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Figure 1:
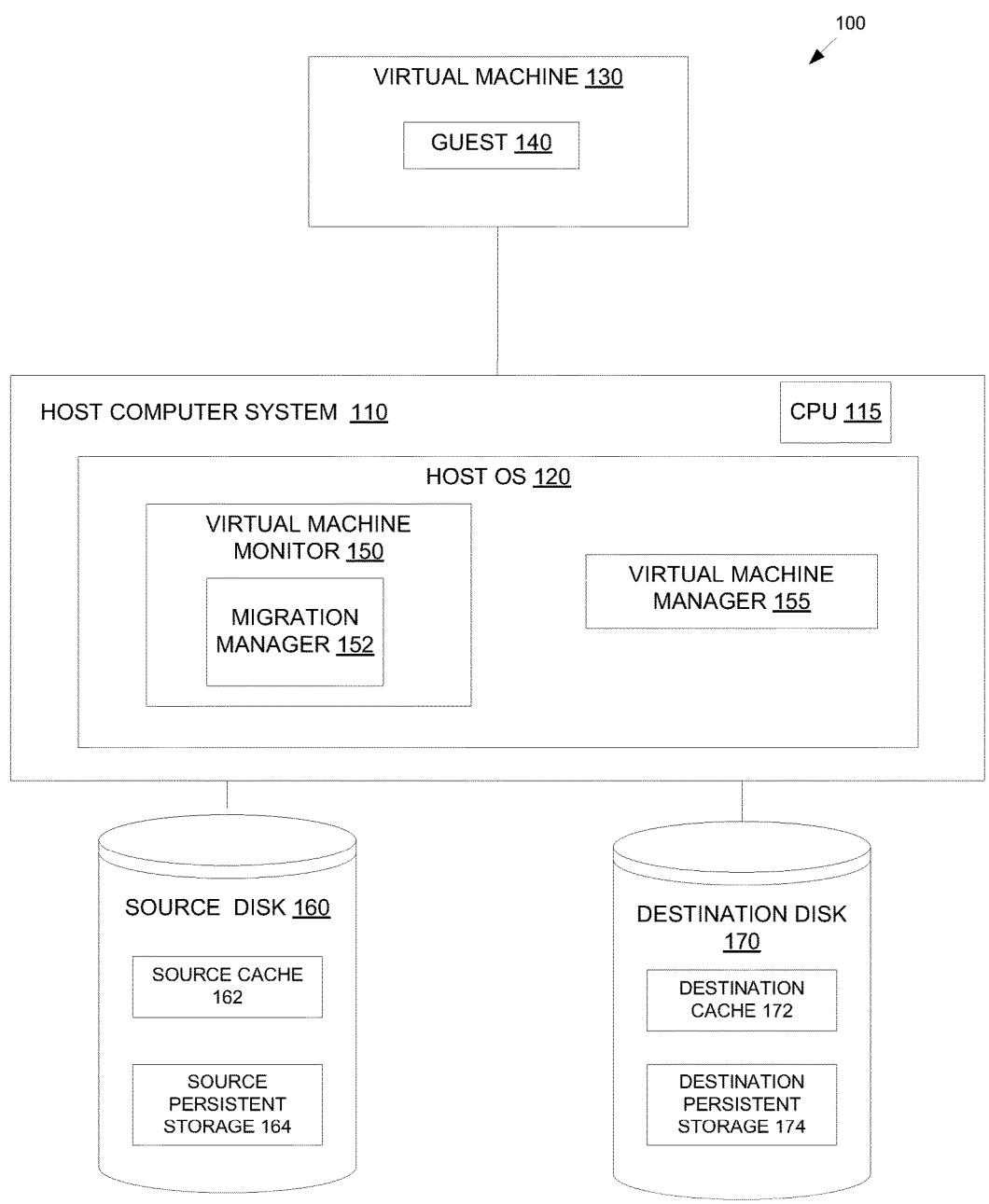
FIG. 1 is a block diagram of an exemplary network architecture in which embodiments of the present disclosure may operate.

Examples of the present disclosure provide for a mechanism for migrating storage of a virtual machine from a source disk to a destination disk in a virtualization system. The virtualization system includes a virtual machine monitor configured to manage resources when a virtual machine is running, including management of the migration process and execution of a request to switch the virtual machine from the source disk to the destination disk. The virtualization system also includes a virtual machine manager configured to manage resources while the virtual machine is not running or off, and to forward requests to the virtual machine monitor while the virtual machine is running, including starting the migration process and requesting a switch from the source disk to the destination disk. The virtual machine manager keeps an up-to-date configuration of the virtual machine, and should not restart the virtual machine using the destination disk unless it has safely completed the switch (e.g., that the contents of the source disk and destination disk are identical).

According to examples of the present disclosure, the virtual machine monitor is configured to execute a migration method which includes a synchronization phase during which replication or mirroring of disk writes (i.e., the sending of data to a disk for writing at a given storage location) is handled asynchronously by the virtual machine monitor and a steady state phase during which disk flushes (i.e., a request to a disk to write data pending in the disk's volatile cache to persistent storage (e.g., physical storage or non-volatile cache)) are handled synchronously by the virtual machine monitor. Advantageously, the partially synchronous operation of the virtual machine monitor allows the virtual machine to be started using the destination disk in the event that migration fails to complete due to a power loss or a forceful termination of the virtual machine monitor on part of the operating system. In addition, if the virtual machine monitor fails to receive a switch command from the virtual machine manager, the synchronous handling of the flush requests from the guest enables the state of the destination disk to be consistent at all times with the guest-visible state of the source disk.

The migration process operates in the synchronization phase until the contents of the source disk and the contents of the destination disk are equal. During the synchronization phase, the virtual machine may not be safely switched to the destination disk, since the guest operating system of the virtual machine may have issued disk writes to the source disk which have not yet been mirrored or replicated to the destination disk. Upon completion of the mirroring or replicating the entire set of disk writes from the source disk to the destination disk, the migration phase enters the steady state phase (or "steady state").

During the steady state, replication of disk writes (also referred to as "writes") is handled asynchronously. As used herein, a disk write includes a command or request from a guest operating system of a virtual machine to send data to a disk. Furthermore, during the steady state, disk cache flushes (also referred to as a "disk flushes" or "flushes") are handled synchronously. As used herein, a disk cache flush is a command or request from the guest operating system to write all data pending in the volatile cache associated with a disk to persistent storage associated with the disk (e.g., physical storage or non-volatile cache).

According to examples of the present disclosure, the virtual machine manager is configured to track and record a "source-generation count" associated with the source disk. The source-generation count is an abstract representation of the data or contents of the source disk. In an example, the source-generation count may be defined as the number of writes that have been completed on the source disk at a given time during the migration process. In another example, the source-generation count may be defined as the number of writes that have been completed on the source disk or any other subset of disks of the virtual machine at a given time during the migration process. In another example, the source-generation count may be represented by a timestamp, wherein the virtual machine monitor stores the timestamp into the source-generation count of the virtual disk every time it receives a write request.

In addition, the virtual machine manager is configured to track and record three additional values relating to the source-generation count which represent the relationship between the content of the source disk and the content of the destination disk: a "writes-mirrored" value, a "flush-request" value, and a "writes-flushed" value. The virtual machine manager may track and use these values to identify when the contents in the two disks are equal. It is noted that the source and destination disks may not have identical contents to be deemed "equal", but may be considered equal if the contents are the same as of or up to the last flush. The writes-mirrored value represents a number of disk writes completed on the source disk at a time when the contents of the source disk and a destination disk are equal (e.g., when the source disk and destination disk are in sync). The flush-request value represents a source-generation count at the time the guest operation system requests a flush (e.g., the number of writes to the source disk at the time of the last flush request of the source disk). The writes-flushed value represents the value of the writes-mirrored value the last time the destination disk was flushed (e.g., at the time the data was sent from the destination disk's cache to the destination disk's persistent storage).

The virtual machine manager may consider the aforementioned values and their respective relationships in managing the migration of the virtual machine's storage from the source disk to the destination disk during the steady state in a hybrid manner wherein disk writes are handled synchronously and flush requests are handled asynchronously, as described in more detail with respect to FIGS. 3 and 4 below.

FIG. 1 illustrates an example network architecture 100 in which embodiments of the present disclosure may operate. The network architecture 100 includes one or more host computer systems 110 configured to host multiple virtual machines 130. Each host computer system 110 runs a virtual machine manager 155 to manage its resources and to dispatch requests for the virtual machine 130 (e.g., start, stop, migrate storage, etc.). Each virtual machine 130 runs a guest operating system (e.g., guest 140). Each virtual machine 130 runs within a virtual machine monitor 150 that manages the virtual machine resources and provides access to physical or virtual hardware. The virtual machines 130 may run the same or different guest operating systems, such as Microsoft Windows®, Linux®, Solaris®, Mac® OS, etc. In one example, the host computer system 100 is accessible by multiple client devices via a network, which may be a private network (e.g., a local area network (LAN), a wide area network (WAN), intranet, etc.) or a public network (e.g., the Internet), or combination thereof. It is noted that the client devices may be any physical or virtual device, such as, for example, a video display (e.g., a video graphics array (VGA)), a keyboard, a printer, a network component, and a peripheral component interconnect (PCI) device.

Throughout the following description, the term "guest" refers to the software that runs or can run on the virtual machine monitor 150 that is installed on a disk, loaded into memory, or currently running. A guest may include one or more of the following: a firmware copy in memory, an operating system, additional installed software, a browser, applications running on the browser, etc. The term "virtual machine" (VM) refers to part of the virtual machine monitor 150 that is visible to the guest. A virtual machine may include one or more of the following: memory, virtual CPU, virtual devices (e.g., emulated NIC or disk), physical devices over which a guest is given partial or full control, firmware such as Basic Input/Output System (BIOS), Extensible Firmware Interface (EFI) and Advanced Configuration and Power Interface (ACPI) which is provided to the guest, etc.

The host computer system 110 may be a server, a workstation, a personal computer (PC), a mobile phone, a palm-sized computing device, a personal digital assistant (PDA), etc. The host computer system 110 may also be coupled to one or more data stores including a source disk 160 and a destination disk 170. The data stores may be shared storage available to the host computer systems 110 and/or may be network data stores such as a storage area network (SAN), network attached storage (NAS) or cloud based storage (e.g., storage as a service (SaaS)).

In an example, the host computer system 110 runs a virtual machine monitor 150 and a virtual machine manager 155 to virtualize access to the resources available to the host computer system 110, making the use of the virtual machine 130 transparent to the guest 140 and the users of the host computer system 110. In one example, the virtual machine monitor 150 and the virtual machine manager 155 are components of a host operating system (OS) 120. Alternatively, the virtual machine monitor 150 and the virtual machine manager 155 may run on top of a host OS 120, or may run directly on host hardware without the use of a host OS. The virtual machine monitor 150 and the virtual machine manager 155 manages system resources, including access to memory, devices, storage devices (e.g., source disk 160 and destination disk 170), and so on. The virtual machine monitor 150 and the virtual machine manager 155, though typically implemented in software, may emulate and export a bare machine interface (host hardware) to higher level software. Such higher level software may comprise a standard or real-time operating system (OS), may be a highly stripped down operating environment with limited operating system functionality, may not include traditional OS facilities, etc. The virtual machine monitor 150 and the virtual machine manager 155 present to other software (i.e., "guest" software) the abstraction of the virtual machine 130 which may provide the same or different abstractions to various guest software (e.g., guest operating system, guest applications, etc.) in a manner such that the guest is not aware that a migration process has been started, completed, aborted, etc. (e.g., the migration process and its current state is transparent to the guest).

The source disk 160 may include source cache 162 (e.g., the buffer memory or volatile memory of a hard drive) and source persistent storage 164 (e.g., non-volatile cache or physical storage of a hard drive). In addition, the destination disk 170 may include destination cache 172 (e.g., the buffer memory or volatile memory of a hard drive) and destination persistent storage 174 (e.g., non-volatile cache or physical storage of a hard drive). As described above, the disk write request (or disk write) includes an instruction to write data to a disk (e.g., write the data to the cache of the disk). As described above, a disk cache flush request or flush request includes an instruction to the disk (either the source disk or the destination disk) to write data (e.g., entire content) pending in cache (e.g., source cache 162 or destination cache 172) to a position in the persistent storage (e.g., source persistent storage 164 or destination persistent storage 174), and the virtual machine monitor 150 reports completion of the disk flush to the virtual machine after data has been written in the persistent storage. In an example, during the migration process, the guest may treat the write request as persistent (e.g., the data is written in the persistent storage of the destination disk) if the flush request (e.g., the request to write pending data to persistent storage) is sent after the write request has been completed (e.g., the data is written to the cache of the source disk and replicated or mirrored to the destination disk) and the guest receives confirmation that the flush request is complete.

The virtual machine monitor 150 is configured to manage the resources when the virtual machine 130 is running. The virtual machine monitor 150 may include a migration manager 152 configured to manage the migration process and execute a request to switch the virtual machine 130 from the source disk 160 to the destination disk 170. The host computer system 110 also includes a virtual machine manager 155 configured to manage resources while the virtual machine 130 is not running (or off), and to forward requests to the virtual machine monitor while the virtual machine is running, including starting the migration process and requesting a switch from the source disk to the execution disk. In an example, the virtual machine manager may keep an up-to-date configuration of the virtual machine, and may only restart the virtual machine using the destination disk upon determining that the migration is complete and that it is safe to complete the switch. In an example, determining that it is safe to complete the switch may not require the actual contents of the source persistent storage 164 and destination persistent storage 174 to be identical (e.g., identical on persistent storage), as long as the guest can determine that some writes have not reached the persistent storage (e.g., because a flush request for those writes was never sent or had failed).

According to embodiments of the present disclosure, the host computer system 110 may also include hardware components such as one or more physical central processing units (CPUs) 115 and other hardware components. In one embodiment, the virtual machine monitor 150 includes a migration manager 152. The migration manager 152 is a component (i.e., a set of instructions executable by a processing device of the host computer system 110, such as CPU 115) configured to perform the actions described in detail below with regard to FIGS. 2-4. Although shown as a discrete component of the virtual machine monitor 150, it is noted that the migration manager 152 may be a separate component externally coupled to the virtual machine monitor 150.

In an embodiment, the migration manager 152 may be configured to track, record, and maintain the source-generation count, the writes-mirrored value, the flush-request value and the writes-flushed value for asynchronously managing the replication of disk writes to the destination disk while synchronously managing the disk flush requests on the source disk and the destination disk, as described below in detail with regard to FIGS. 2 and 3.

Figure 2:
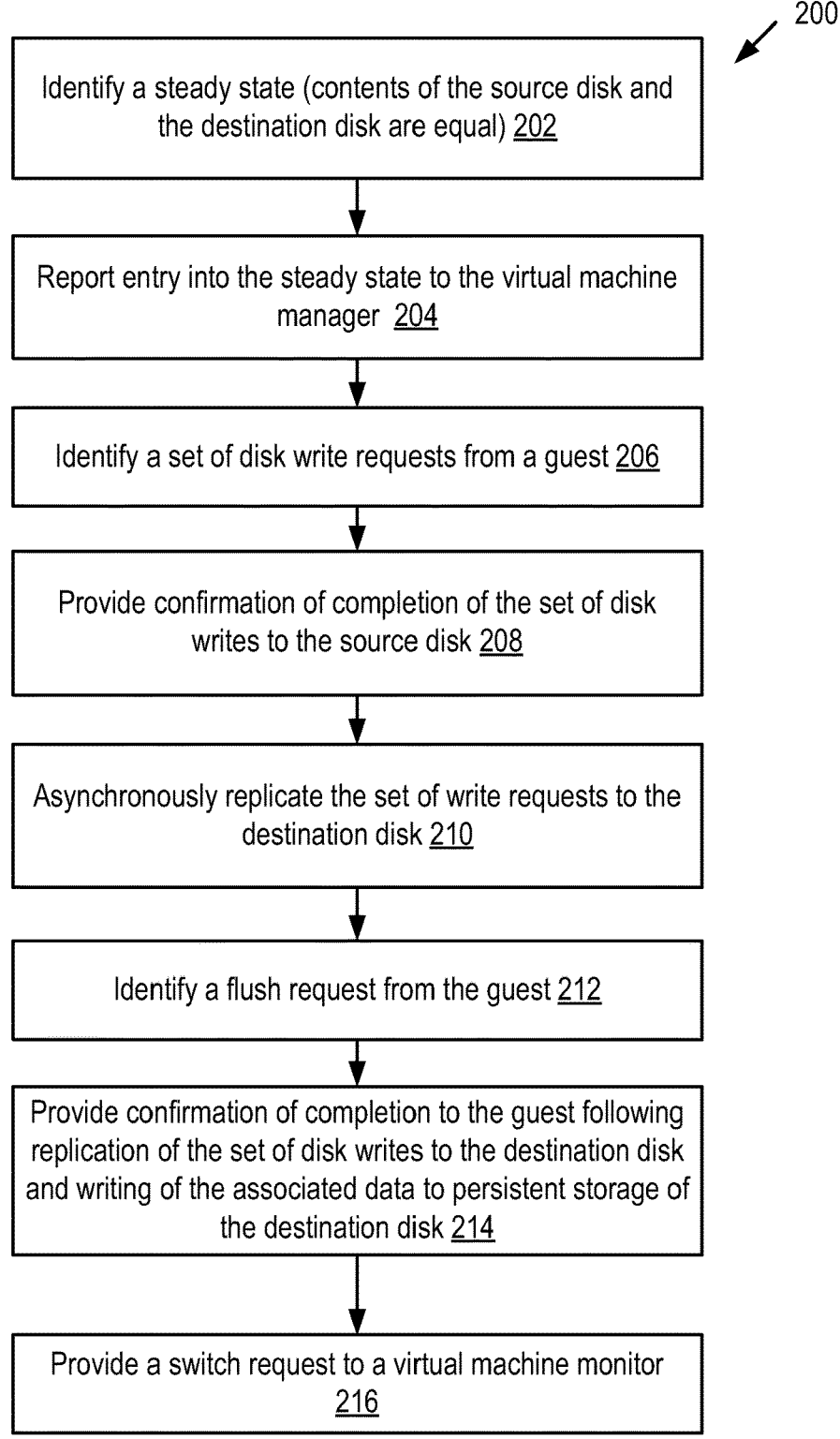
FIG. 2 is a flow diagram illustrating a method for migrating a virtual machine's storage from a source disk to a destination disk.

FIG. 2 illustrates an example method 200 for migrating storage of a virtual machine from a source disk (e.g., source disk 160 of FIG. 1) to a destination disk (e.g., destination disk 170 of FIG. 1). According to examples of the migration method 200, disk writes are replicated/mirrored to the destination disk asynchronously and disk flush requests are handled synchronously. The migration method 200 may be performed by a computer system (e.g., host computer system 110 of FIG. 1 or computer system 500 of FIG. 5 comprising hardware (e.g., circuitry, dedicated logic, programmable logic, microcode, etc.), software (e.g., instructions run on a processing device), or a combination thereof. In one embodiment, the method 200 is performed by the migration manager 152 of FIG. 1.

As shown in FIG. 1, the migration method 200 begins when the storage migration transitions from a synchronization phase to a steady state phase. A steady state phase is entered and identified when the contents of the source disk and the destination disk become equal as a result of the synchronization phase. The virtual machine monitor may recognize that the source disk and the destination disk have the same contents, in block 202, and report entry into the steady state to the virtual machine manager, in block 204.

According to an example, the virtual machine monitor may recognize that the source disk and the destination disk have equal contents by using a dirty bitmap. A dirty bitmap records disk sectors that have been written on the source but not the destination. The sectors are recorded in the dirty bitmap after each write is completed to enable the reading back of the newly-written contents during the migration process. During the migration method 200, the virtual machine monitor may repeatedly seek a dirty sector in the bitmap. Before reading those sectors back from the source disk, those sectors are removed from the bitmap so that a concurrent write to the same sectors would cause the sectors to be re-examined. In an example, the dirty bitmap may initially mark all sectors as "dirty". In an example, sectors that are absent in the source disk may be marked as clean. Using the dirty bitmap check process, the virtual machine monitor may determine that the source disk and the destination disk have the same contents if the dirty bitmap is emptied (e.g., all sectors of the dirty bitmap are clean) both before and after the destination disk has been flushed successfully.

In the steady state phase, the virtual machine monitor identifies disk write requests (e.g., a set of disk write requests) sent by the guest to the virtual hardware provided by the virtual machine monitor, in block 206, performs disk writes to the source disk, and provides confirmation of completion of the set of disk writes to the source disk to the guest, in block 208. In an example, the virtual machine monitor identifies and/or detects the disk write request and the disk flush requests while emulating the virtual hardware. In block 210, the virtual machine monitor manages the replication of these disk writes asynchronously (e.g., not in real-time). In an example, the new disk writes are asynchronously replicated to the destination disk, following successful completion of the writes to the source disk, which has been reported to the guest.

In an example, the virtual machine monitor may employ an active/asynchronous replication process wherein the location of the new writes are recorded in a list including an identification of a starting sector, a sector count and the content written to the disk. In an active scheme, disk writes are transmitted to the destination disk as they occur on the source disk. The data associated with the new writes is stored in memory on the host system at the time the write occurs, and later read back. In an example, the data in the destination disk may be stored in a compressed format.

In an example, the virtual machine monitor may employ a passive/asynchronous replication process wherein the location of a new write is remembered to a dirty bitmap and the data associated with the new writes is read back from the source disk. In a passive scheme, the destination disk is periodically updated with the result of the disk writes. In this example, new writes may be replicated out of sequence and/or contiguous writes may be merged. In an example, each item of the dirty bitmap may track a group including more than one sector. In this example, the data in the destination disk may be stored in a compressed format.

In an example, during a passive/asynchronous replication process, if data associated with new writes is read back from the source disk, the destination disk may fetch the data from the source disk, so that the virtual machine monitor does not need to execute separate read and write steps.

During the steady state, the virtual machine monitor may identify one or more flush requests from the guest, in block 212. As described above, the virtual machine monitor is configured to handle the flush requests synchronously. In an example, the virtual machine monitor waits for all previous write requests to be replicated or mirrored to the destination disk prior to flushing the destination disk. In block 214, the virtual machine monitor provides confirmation of completion of the flush request to the guest after replication of the set of disk writes to the destination disk and writing of the data associated with the write requests to persistent storage of the destination disk. Accordingly, the guest is able to treat issued write requests as definitive (e.g., confirmed as completed) since the flush request was reported as completed indicating that the data has been written to the persistent storage of the destination disk.

Following block 214, the virtual machine manager provides a switch request to the virtual machine monitor indicating that the virtual machine may safely be switched by the virtual machine monitor to the destination disk and issue any subsequent write requests to the destination disk only (e.g., the write requests are no longer issued to the source disk).

In an example, the virtual machine monitor may recognize instances when the contents of the source disk and the destination disk are identical and elect to keep the migration process "inactive" or "quiescent" (e.g., in an idle state) for a period of time (e.g., for some predetermined amount of time). In another example, the migration method 200 may be "inactive" or "quiescent" (e.g., in an idle state) for a period of time in response to an event, such as, for example, a user request to suspend the migration or due to a storage error affecting the destination disk. If the suspension of the migration process occurs during the steady state, the virtual machine monitor may elect to re-enter the synchronization phase. As an alternative, the virtual machine monitor may elect to remain in the steady state, resulting in the failure of attempts to switch the virtual machine to the destination disk (e.g., with a corresponding error message such as "disk migration suspended") or automatically resume the migration method after the error is cleared or resolved.

In another example, the source disk may be split or divided into a "base" image and an "overlay" image. In this example, the "overlay" image starts with all sectors marked as "absent". Disk writes are sent to the "overlay" image, and the corresponding sectors of the "overlay" image are marked as present. Reads are also sent to the "overlay" image, except for sectors that are absent in the "overlay" image, which are fetched from the "base" image. The "overlay" image may track the presence or absence for groups including more than one sector, rather than for each sector separately. In this example, the migration method 200 may be employed for the migration of the overlay image only (e.g., only the overlay image is migrated In an example, at the time migration starts, the virtual machine monitor places the current state of the disk into a "base" image, with an empty "overlay" image receiving future writes. Because the "overlay" image is empty at the time migration starts, the synchronization phase terminates immediately and the virtual machine monitor may start migration directly in the steady state.

Figure 3:
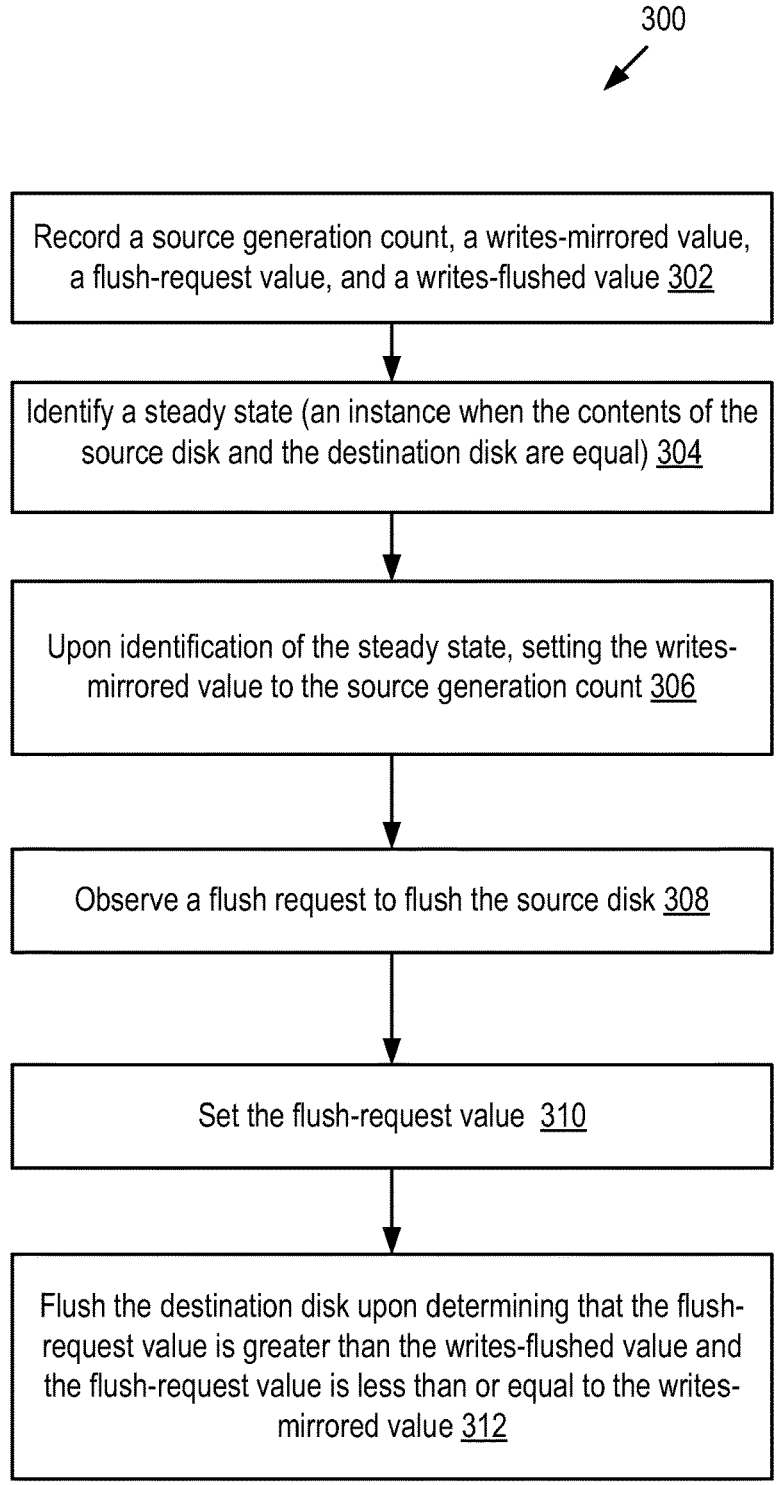
FIG. 3 is a flow diagram illustrating a method for periodically flushing a destination disk.

FIG. 3 illustrates an example method 300 for periodically flushing a destination disk (e.g., destination disk 170 of FIG. 1). The method 300 may be performed by a computer system (e.g., host computer system 110 of FIG. 1 or computer system 500 of FIG. 5 comprising hardware (e.g., circuitry, dedicated logic, programmable logic, microcode, etc.), software (e.g., instructions run on a processing device), or a combination thereof. In one embodiment, the method 300 is performed by the migration manager 152 of FIG. 1.

In connection with method 300, the virtual machine monitor tracks and records the source-generation count associated with the source disk, which reflects an abstract representation of the data or contents of the source disk. In an example, the source-generation count provides a value of the number of writes that have been completed on the source disk at a given time during the migration process, and the virtual machine monitor increments a running count every time it receives a write request on the virtual disks of the virtual machine 130, and copies the running count to the source-generation count of the virtual disk.

In an example, when multiple disks require a generation count, the generation numbers may be derived from a single running count for disks in the same "pool" of disks (e.g., a global count of write operations on all disks in the virtual machine is recorded) or a generation count may be separately maintained for each disk in the pool. In an example, the disks may be partitioned (e.g., in an arbitrary manner) and the generation count may reflect or count all writes to the same partition.

In another example, the source-generation count may be associated with a timestamp, and the virtual machine monitor stores the timestamp into the source-generation count of the virtual disk every time it receives a write request.

In an example, the source-generation count may be maintained in addition to the dirty bitmap and is incremented or updated at the time the dirty bitmap is updated. In an example, the virtual machine monitor 150 is composed of multiple parallel threads of execution, and access to the data structures associated with the dirty bitmap will always be mutually exclusive with access to the source-generation count. In this example, attempts to access the dirty bitmap and source-generation count will be properly protected using a synchronization technique, such as a lock.

As described above, the virtual machine monitor is configured to track and record three additional values relating to the source-generation count which represent the relationship between the content of the source disk and the content of the destination disk: the writes-mirrored value, the flush-request value, and the writes-flushed value, in block 302. The virtual machine monitor may track and compare these values with one another to identify when the contents in the two disks are equal and successful completion of a flush request can be communicated to the guest, as described in more detail below in connection with FIGS. 3 and 4. In an example, the tracking and recording of the aforementioned values may be performed by the migration manager 152 of the virtual machine monitor 150 of FIG. 1. The virtual machine monitor may consider the aforementioned values and their respective relationships to synchronously handle flush requests, as shown in example method 300. In an example, the aforementioned values may be accessed simultaneously by the migration process, and by other threads of execution that issue a flush operation/request to the disk. In this example, such attempts to access the values may be properly protected using a synchronization technique, such as a lock.

In block 304, the virtual machine monitor recognizes that the source disk and the destination disk are equal, thus identifying the steady state. The virtual machine monitor then records the current source-generation count (e.g., the number of writes to the source disk) and sets the writes-mirrored value to be equal the source-generation count (since the virtual machine monitor has determined that the contents are equal, the writes-mirrored value (e.g., the number of writes mirrored or replicated from the source disk to the destination disk) is equal to the number of writes to the source disk (e.g., the source-generation count)), in block 306.

In block 308, a periodic check is made for requests to flush the source disk, and upon observing a flush request, the flush-request value may be set to the source-generation count, in block 310. In another example, if the migration process is inactive or quiescent (e.g., in an idle state) awaiting new writes, requests to flush the source disk may be used as a trigger to immediately unpause or wake-up the migration process. In this example, a synchronization technique, such as a condition variable or a fast user-space mutex ("futex") is used to notify the migration process of changes in the flush-request value.

In block 312, in response to the identified request to flush the source disk, the destination disk is flushed. In an example, the destination disk is flushed in response to a request for a flush for a source-generation count that is "newer" or greater than the writes-flushed value and not newer (or greater than) the writes-mirrored value (i.e., the flush-request value>the writes-flushed value AND the flush-request value is≤the writes-mirrored value). After the flush completes, the data on the destination disk's persistent storage is at least as new as the data on the source disk. Accordingly, the writes-flushed value is set to the writes-mirrored value.

In an example, the virtual machine monitor may ignore a request to flush for a source-generation count that is "older" than the most-recently-flushed generation (e.g., the flush-request value<the writes-flushed value).

During the migration process, and in parallel to the method described in connection with FIG. 3, the virtual machine monitor may use the source-generation count and recorded values to manage the flush requests so that those requests are executed following replication of previous write requests to the destination disk, as illustrated in the example method shown in FIG. 4.

In an example, the virtual machine monitor receives flush requests from the virtual machine which may result in a change of the flush-request count. A migration process implemented by the virtual machine monitor is configured to observe, identify, and/or track any changes to the flush-request count. The migration process replicates these writes to the destination disk and flushes the destination disk. The migration process provides a "go" instruction (e.g., a confirmation to proceed) to the virtual machine monitor by modifying the writes-flushed count (e.g., incrementing the writes-flushed count to match the writes-mirrored count). In an example, until the confirmation instruction is provided by the migration process, the flush request is put on hold and does not report success to the guest, and the virtual machine monitor waits for the writes-flushed count to be at least as high as the value of the source-generation count at the time the flush request was started.

Figure 4:
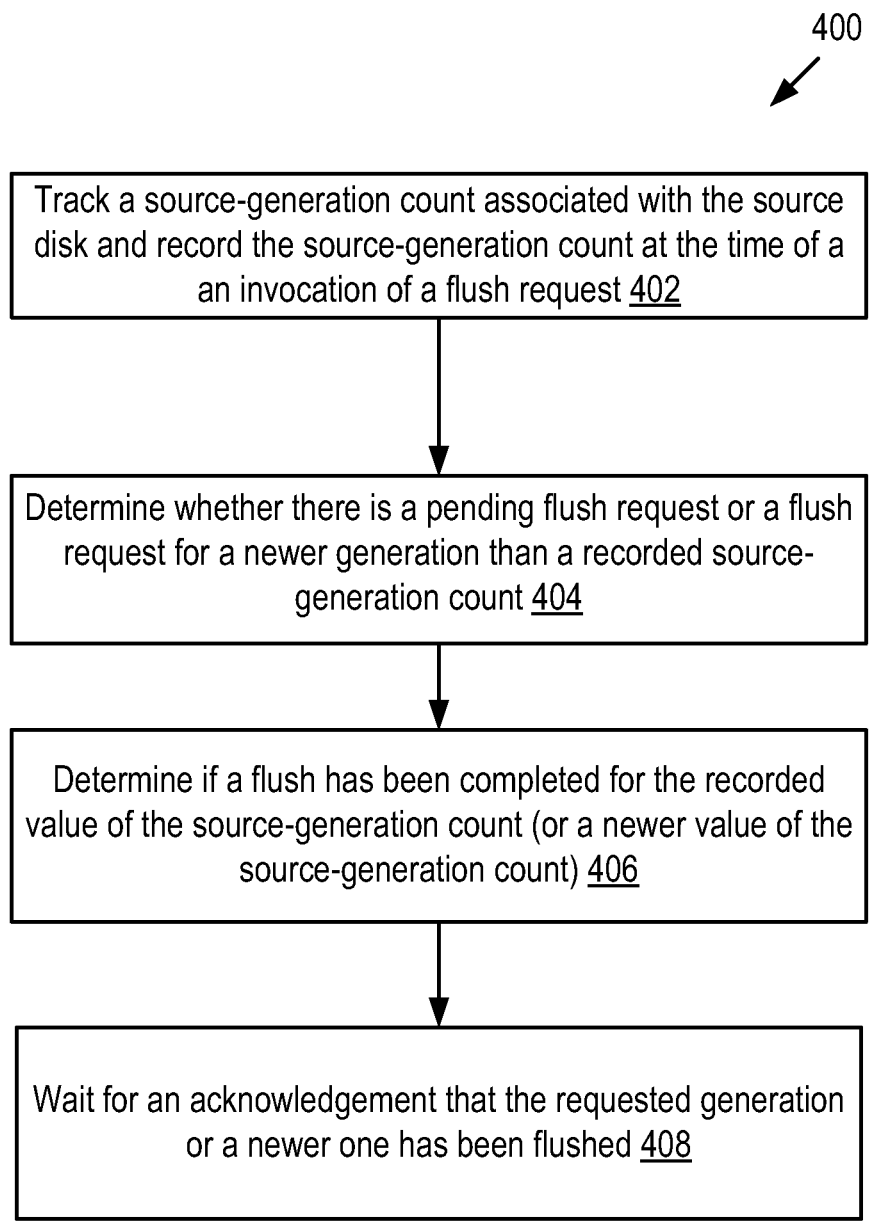
FIG. 4 is a flow diagram for tracking a source-generation count as it relates to a storage migration method.

With respect to FIG. 4, while migration is in the steady state, at the time of invocation of a flush request, the source-generation count is recorded, in block 402. In an example, the virtual machine monitor may check that no flush request is pending, or if there is a pending flush request for a newer generation than source-generation count, in block 404. If any of these conditions are true (i.e., the flush-request value is<=the writes-flushed value OR the flush-request value>=source-generation count), then the flush-request value is set to the source-generation count. In an example, if none of the conditions hold, it is determined that a previous flush request is in flight, and that flush request may complete before the current flush request. Accordingly, the current flush request is not executed and the situation is reassessed after the previous flush request is completed.

In block 406, the virtual machine monitor may further check if a flush has already been completed for this value of the source-generation count (e.g., the value of the source-generation count set in block 402) or for a more recent (or newer) value of the source-generation count (i.e., the writes-flushed value is>=the source-generation count). In an example, the virtual machine monitor may await an acknowledgement that the requested generation (or a newer generation) has been flushed. If so, the virtual machine monitor provides confirmation of the completed flush to the guest. If not, the virtual machine monitor waits to report confirmation of the completion of the flush request until the writes flushed value is less than or equal to the source-generation count. In this case, during the waiting period, every time the writes-flushed value changes, the virtual machine monitor continues to check that no flush request is pending (i.e., the flush-request value is<=the writes-flushed value OR the flush-request value>=source-generation count), or if a flush has already been completed for the current value of the source-generation count (i.e., the writes-flushed value≥the source-generation count).

In an example, flushing the source disk may happen in parallel to the above steps, before them, or after them. If the source disk has write-through cache, the steps are performed as well after every write operation has been completed on the source disk (e.g., after every update to the source-generation count).

In an example, if the migration process is inactive or quiescent, the pause may be interrupted every time the flush-request value is changed, so that the flush of the destination disk occurs in a timely manner. In another example, a check may be performed prior to block 404, wherein if the migration process is waiting for disk writes to occur on the source disk (e.g., the migration process is inactive or quiescent), the virtual machine monitor may check whether the writes-mirrored value is≥the writes-flushed value. If so, the virtual machine monitor records the writes-mirrored value and issues a flush of the destination disk. After the flush completes, and if the writes-flushed value remains less than the recorded value of writes-mirrored, the virtual machine monitor sets the writes-flushed value to the write-mirrored value and exits. In this example, the virtual machine monitor also checks if the writes-mirrored value is<the source-generation count, and, if so, activates the quiescent or "waiting" migration process (i.e., the waiting is interrupted).

In an example, if an error occurs while flushing, the virtual machine monitor may report the error to the guest. In another example, if a flushing error occurs, the virtual machine monitor may stop the virtual machine and report the error to the virtual machine manager, then retry the flush when the virtual machine is restarted.

In an example, flushing the source disk may occur in parallel to method 400, before method 400 or after method 400. In an example, if the source disk has write-through cache (e.g., each write request behaves as if it includes a flush request), method 400 is performed after every write operation has been completed on the source disk (e.g., after every update to the source-generation count).

In an example, flush requests may be reordered, wherein requests to flush the destination disk for an older source-generation count may be served before requests to flush the destination disk for a newer source-generation count.

Figure 5:
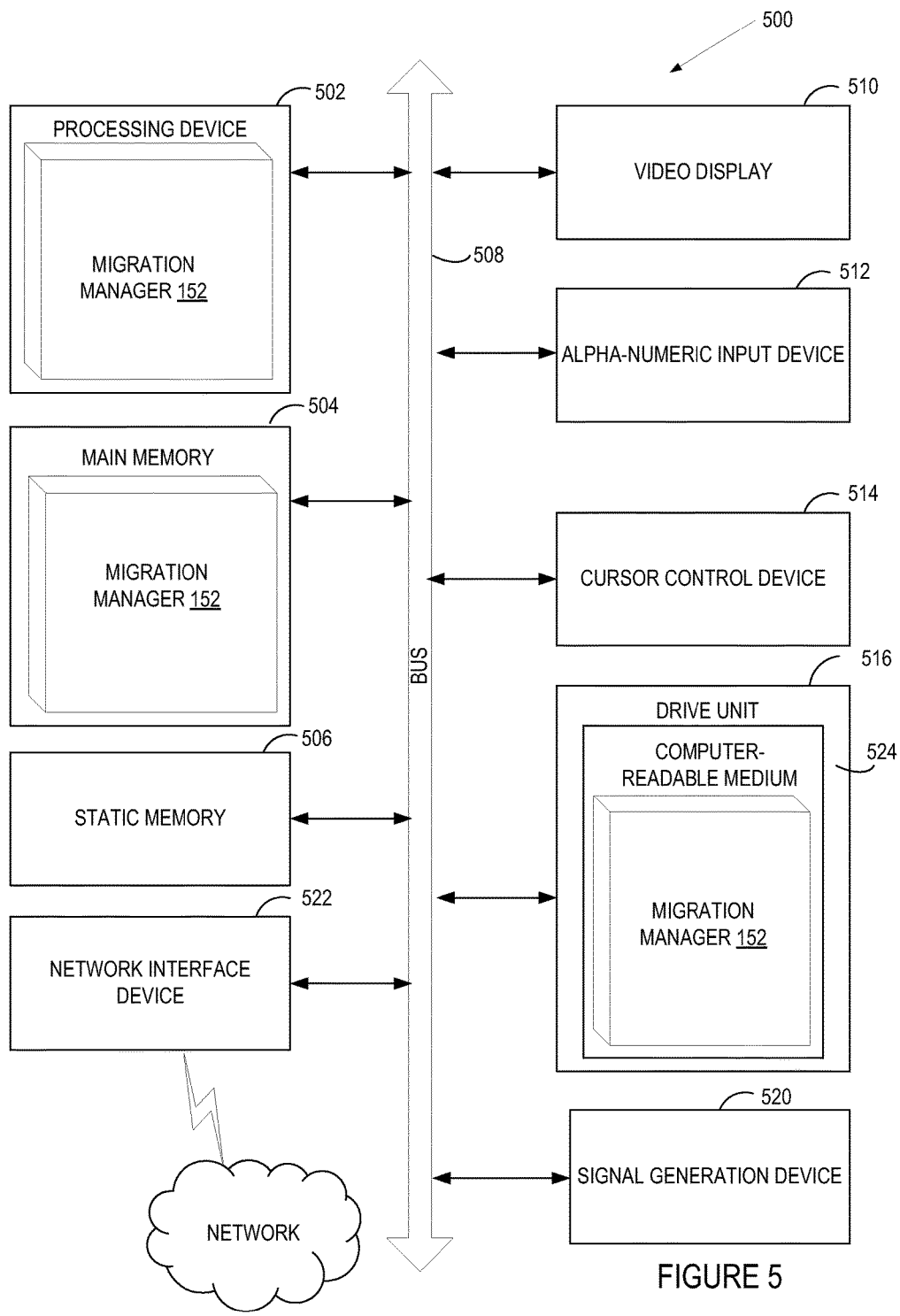
FIG. 5 illustrates a block diagram of one embodiment of a computer system.

FIG. 5 illustrates a diagrammatic representation of a machine in the exemplary form of a computer system 500 within which a set of instructions, for causing the machine to perform any one or more of the methodologies discussed herein, may be executed. The computer system 500 may correspond to a host computer system 110 of FIG. 1. In embodiments of the present disclosure, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 500 includes a processing device 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a secondary memory 516 (e.g., a data storage device), which communicate with each other via a bus 508.

The processing device 502 represents one or more general-purpose processors such as a microprocessor, central processing unit, or the like. The processing device 502 may include a complex instruction set computing (CISC) microprocessor, reduced instruction set computing (RISC) microprocessor, very long instruction word (VLIW) microprocessor, processor implementing other instruction sets, or processors implementing a combination of instruction sets. The processing device 502 may also be one or more special-purpose processing devices such as an application specific integrated circuit (ASIC), a field programmable gate array (FPGA), a digital signal processor (DSP), network processor, or the like.

The computer system 500 may further include a network interface device 522. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 520 (e.g., a speaker).

The secondary memory 516 may include a machine-readable storage medium (or more specifically a computer-readable storage medium) 524 on which is stored one or more sets of instructions embodying any one or more of the methodologies or functions described herein (e.g., migration manager 152 which may correspond to migration manager 152 of FIG. 1). The instructions may also reside, completely or at least partially, within the main memory 504 and/or within the processing device 502 during execution thereof by the computer system 500; the main memory 504 and the processing device 502 also constituting machine-readable storage media.

While the computer-readable storage medium 524 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing or encoding a set of instructions for execution by the machine that cause the machine to perform any one or more of the methodologies of the present disclosure. The term "computer-readable storage medium" shall accordingly be taken to include, but not be limited to, solid-state memories, and optical and magnetic media.

The computer system 500 may additionally include an interrupt programming module (not shown) for implementing the functionalities of the interrupt programmer. The modules, components and other features described herein (for example in relation to FIG. 1) can be implemented as discrete hardware components or integrated in the functionality of hardware components such as ASICs, FPGAs, DSPs or similar devices. In addition, the modules can be implemented as firmware or functional circuitry within hardware devices. Further, the modules can be implemented in any combination of hardware devices and software components, or only in software.

Some portions of the detailed descriptions have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "identifying", "reporting", "receiving", "providing", "replicating", "switching", or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present disclosure also relate to an apparatus for performing the operations herein. This apparatus may be specially constructed for the discussed purposes, or it may comprise a general purpose computer system selectively programmed by a computer program stored in the computer system. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the method steps. The structure for a variety of these systems will appear as set forth in the description above. In addition, the present disclosure is not described with reference to any particular programming language. It will be appreciated that a variety of programming languages may be used to implement the teachings of the disclosure as described herein.

It is to be understood that the above description is intended to be illustrative, and not restrictive. Many other embodiments will be apparent to those of skill in the art upon reading and understanding the above description. Although the present disclosure has been described with reference to specific exemplary embodiments, it will be recognized that the disclosure is not limited to the embodiments described, but can be practiced with modification and alteration within the spirit and scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

What is claimed is:

1. A method comprising:
   identifying, by a processing device executing a virtual machine monitor, a steady state wherein a first count of writes associated with a virtual machine stored on a source physical disk and a destination physical disk are equal;
   receiving, by the virtual machine monitor, a set of write requests comprising data from a guest operating system of the virtual machine;
   providing, by the virtual machine monitor to the guest operating system, confirmation of a completion of a set of writes to the source physical disk;
   following providing to the guest operating system the confirmation of the completion of the set of writes to the source physical disk, asynchronously replicating, by the virtual machine monitor, the set of write requests to the destination physical disk;
   receiving, by the virtual machine monitor, a flush request from the guest operating system of the virtual machine, wherein the flush request comprises an instruction to the destination physical disk to write the data pending in cache of the destination physical disk to persistent storage of the destination physical disk;
   determining a second count of writes completed on the source physical disk at a time of a previous flush request is less than or equal to the first count of writes identified at the steady state;
   flushing, by the virtual machine monitor, the destination physical disk in response to the determining;
   providing, by the virtual machine monitor, to the guest operating system, confirmation of completion of the flushing of the destination physical disk following replication of the set of write requests to the destination physical disk and writing of the data to persistent storage of the destination physical disk;
   receiving, by the virtual machine monitor, a switch request from the virtual machine manager; and
   switching, by the virtual machine monitor, the virtual machine to the destination physical disk and issuing subsequent write requests to the destination physical disk.

2. The method of claim 1, further comprising reporting to the virtual machine manager, by the virtual machine monitor, entry into the steady state.

3. The method of claim 1, wherein identifying the steady state further comprises:
   maintaining a dirty bitmap to record a disk sector that have been written to on the source disk but not the destination disk; and
   emptying the dirty bitmap.

4. The method of claim 1, further comprising operating in a synchronization phase prior to the steady state, wherein the synchronization phase comprises migrating the contents of the source disk to the destination disk.

5. The method of claim 4, further comprising entering the synchronization phase in response to at least one of receiving a request from the virtual machine manager or detecting an error in the replication of the set of write requests to the destination disk.

6. The method of claim 4, wherein the source disk is divided into a base image and an overlay image, and wherein only contents of the overlay image are migrated to the destination disk during the synchronization phase.

7. The method of claim 1, further comprising delaying processing of a write request to the source disk for a set period of time upon determining the contents stored on the source disk and the destination disk are equal.

8. A non-transitory computer readable storage medium comprising instructions that, when executed by a processing device, cause the processing device:
   identify, by the processing device executing a virtual machine monitor, a steady state wherein a first count of writes associated with a virtual machine stored on a source physical disk and a destination physical disk are equal;
   receive, by the virtual machine monitor, a set of write requests comprising data from a guest operating system of the virtual machine;
   provide, by the virtual machine monitor to the guest operating system, confirmation of a completion of a set of writes to the source physical disk;
   following the confirmation of the completion of the set of writes to the source physical disk being provided to the guest operating system, asynchronously replicate, by the virtual machine monitor, the set of write requests to the destination disk;
   receive, by the virtual machine monitor, a flush request from the guest operating system of the virtual machine, wherein the flush request comprises an instruction to the destination physical disk to write the data pending in cache of the destination physical disk to persistent storage of the destination physical disk;
   determine a second count of writes completed on the source physical disk at a time of a previous flush request is less than or equal to the first count of writes identified at the steady state;
   execute, by the virtual machine monitor, a flush of the destination physical disk in response to a determination that the second count of writes is less than or equal to the first count of writes;
   provide, by the virtual machine monitor to the guest operating system, confirmation of completion of the flush of the destination physical disk following replication of the set of write requests to the destination physical disk and writing of the data to persistent storage of the destination physical disk;

receive, by the virtual machine monitor, a switch request from a virtual machine manager; and switch, by the virtual machine monitor, the virtual machine to the destination physical disk and issuing subsequent write requests to the destination physical disk.

9. The non-transitory computer readable storage medium of claim 8, the processing device to report to the virtual machine manager, by the virtual machine monitor, entry into the steady state.

10. The non-transitory computer readable storage medium of claim 8, the processing device to:

maintain a dirty bitmap to record a disk sector written to on the source physical disk but not the destination physical disk; and empty the dirty bitmap.

11. The non-transitory computer readable storage medium of claim 8, the processing device to operate in a synchronization phase prior to the steady state, wherein the synchronization phase comprises migrating the contents of the source physical disk to the destination physical disk.

12. The non-transitory computer readable storage medium of claim 11, the processing device to enter the synchronization phase in response to at least one of receiving a request from the virtual machine manager or detecting an error in the replication of the set of write requests to the destination physical disk.

13. The non-transitory computer readable storage medium of claim 11, wherein the source physical disk is divided into a base image and an overlay image, and wherein only contents of the overlay image are migrated to the destination physical disk during the synchronization phase.

14. The non-transitory computer readable storage medium of claim 8, the processing device to delay processing of a write request to the source disk for a set period of time upon determining the contents stored on the source physical disk and the destination physical disk are equal.

15. A system comprising:

a memory to store instructions; and a processing device, operatively coupled to the memory, the processing device to execute a virtual machine monitor to execute the instructions to:

identify a steady state wherein a first count of writes associated with a virtual machine stored on a source physical disk and a destination physical disk are equal;

receive a set of write requests comprising data from a guest operating system of the virtual machine;

provide, to the guest operating system, confirmation of a completion of a set of writes to the source physical disk;

following the confirmation of the completion of the set of writes to the source physical disk being provided to the guest operating system, asynchronously replicate the set of write requests to the destination physical disk;

receive a flush request from the guest operating system of the virtual machine, wherein the flush request comprises an instruction to the destination physical disk to write the data pending in cache of the destination physical disk to persistent storage of the destination physical disk;

determine a second count of writes completed on the source physical disk at a time of a previous flush request is less than or equal to the first count of writes identified at the steady state;

execute, by the virtual machine monitor, a flush of the destination physical disk in response to a determination that the second count of writes is less than or equal to the first count of writes;

execute a flush of the destination physical disk in response to a determination that the second count of writes is less than or equal to the first count of writes;

provide, to the guest operating system, confirmation of completion of the flush of the destination physical disk following replication of the set of write requests to the destination physical disk and writing of the data to persistent storage of the destination physical disk;

receive a switch request from the virtual machine manager; and switch the virtual machine to the destination physical disk and issuing subsequent write requests to the destination physical disk.

16. The system of claim 15, the processing device to report to the virtual machine manager, by the virtual machine monitor, entry into the steady state.

17. The system of claim 15, the processing device to:

maintain a dirty bitmap to record a disk sector written to on the source physical disk but not the destination physical disk; and empty the dirty bitmap.

18. The system of claim 15, the processing device to operate in a synchronization phase prior to the steady state, wherein the synchronization phase comprises migrating the contents of the source physical disk to the destination physical disk.

19. The system of claim 18, the processing device to enter the synchronization phase in response to at least one of receiving a request from the virtual machine manager or detecting an error in the replication of the set of write requests to the destination physical disk.

20. The system of claim 18, wherein the source disk is divided into a base image and an overlay image, and wherein only contents of the overlay image are migrated to the destination physical disk during the synchronization phase.

* * * * *